United States Patent
Wen et al.

(10) Patent No.: US 12,215,834 B2
(45) Date of Patent: *Feb. 4, 2025

(54) LIGHTING APPARATUS HAVING FIRST AND SECOND LADDER EDGES TO PREVENT WATER FROM ENTERING CONCEALED SPACE

(71) Applicant: XIAMEN LEEDARSON LIGHTING CO., LTD, Fujian (CN)

(72) Inventors: Xiaoliang Wen, Fujian (CN); Jiahong Chen, Fujian (CN); Yongzhe Dong, Fujian (CN); Shouqiang Hou, Fujian (CN); Zhenkun Huang, Fujian (CN)

(73) Assignee: XIAMEN LEEDARSON LIGHTING CO., LTD, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,864

(22) Filed: Dec. 29, 2022

(65) Prior Publication Data

US 2023/0148323 A1    May 11, 2023

Related U.S. Application Data

(63) Continuation of application No. 17/240,369, filed on Apr. 26, 2021, now Pat. No. 11,572,985.

(30) Foreign Application Priority Data

Apr. 26, 2020    (CN) .......................... 202020656036.6

(51) Int. Cl.
*F21K 9/61* (2016.01)
*F21K 9/66* (2016.01)
(Continued)

(52) U.S. Cl.
CPC .................. *F21K 9/61* (2016.08); *F21K 9/66* (2016.08); *F21S 8/026* (2013.01); *F21V 3/00* (2013.01);
(Continued)

(58) Field of Classification Search
CPC ...... F21V 31/00; F21V 31/005; F21V 21/096; F21V 23/003; F21V 23/06;
(Continued)

(56) References Cited

U.S. PATENT DOCUMENTS 10,585,229 B1 *  3/2020  Lax ........................ F21V 31/005
10,935,221 B1 *  3/2021  Tirosh ................. F21V 23/0464
(Continued)

FOREIGN PATENT DOCUMENTS

CN    109114876 A  *  1/2019  ............. B01D 53/26
EP    2646743 B1  *  3/2018  ............... F21K 9/00
(Continued)

OTHER PUBLICATIONS

Y. Kuromizu, "Lighting Apparatus, Display Apparatus, and Television Receiver Apparatus", Mar. 29, 2012, Image of "WO 2012/039196 A1" merged with English translation text, 30 pages of image plus English translation text. (Year: 2012).*

(Continued)

*Primary Examiner* — Alan B Cariaso
(74) *Attorney, Agent, or Firm* — Chun-Ming Shih; LANWAY IPR SERVICES (57)    ABSTRACT

A lighting apparatus includes a light source, a light passing cover, a back cover and a rim frame. The light source is used for emitting a light. The light passing cover has a first ladder edge. The rim frame has an inner frame and a light source holder. The back cover, the surface rim and the light passing cover define a concealed space. The light source is disposed in the light source holder in the concealed space. The inner (Continued)

frame defines a light opening for the light to escape from the lighting apparatus. The inner frame has a second ladder edge surrounding the light opening. The first ladder edge and the second ladder edge are pressed by the back cover to press to each other. Multiple ladder protrusion surfaces between the first ladder edge and the second ladder edge prevent water to enter the concealed space.

19 Claims, 10 Drawing Sheets

(51) Int. Cl.
    *F21S 8/02*     (2006.01)
    *F21V 3/00*     (2015.01)
    *F21V 3/04*     (2018.01)
    *F21V 8/00*     (2006.01)
    *F21V 21/096*     (2006.01)
    *F21V 23/00*     (2015.01)
    *F21V 23/06*     (2006.01)
    *F21V 31/00*     (2006.01)
    *F21V 33/00*     (2006.01)
    *F21Y 105/00*     (2016.01)
    *F21Y 115/10*     (2016.01)

(52) U.S. Cl.
    CPC .......... *F21V 21/096* (2013.01); *F21V 23/003* (2013.01); *F21V 23/06* (2013.01); *F21V 31/005* (2013.01); *F21V 33/0056* (2013.01); *G02B 6/0036* (2013.01); *G02B 6/0093* (2013.01); *G02B 6/0095* (2013.01); *F21V 3/049* (2013.01); *F21Y 2105/00* (2013.01); *F21Y 2115/10* (2016.08)

(58) Field of Classification Search
    CPC .......... F21V 33/0056; F21V 3/00; F21V 3/04; F21V 3/049; F21K 9/61; F21K 9/66; G02B 6/0093; G02B 6/0095; G02B 6/0036; F21Y 2105/00; F21Y 2115/10; F21S 8/026
    See application file for complete search history.

(56) References Cited

U.S. PATENT DOCUMENTS

| | | | | |
|---|---|---|---|---|
| 11,143,814 | B2* | 10/2021 | Miles | .................... F21V 31/005 |
| 11,181,262 | B2* | 11/2021 | Yaphe | ................... G02B 6/0088 |
| 11,572,985 | B2* | 2/2023 | Wen | ...................... G02B 6/0036 |
| 2010/0188845 | A1* | 7/2010 | Rooms | ...................... F21S 8/04 |
| | | | | 362/396 |
| 2013/0044512 | A1* | 2/2013 | Araki | ..................... G02B 6/009 |
| | | | | 362/249.02 |
| 2014/0071687 | A1* | 3/2014 | Tickner | ................... F21V 21/04 |
| | | | | 362/382 |
| 2019/0075634 | A1* | 3/2019 | Cho | ....................... F21V 23/045 |

FOREIGN PATENT DOCUMENTS

| | | | | |
|---|---|---|---|---|
| KR | 200313767 Y1 * | 5/2003 | ............ F21V 31/005 |
| KR | 101604290 B1 * | 3/2016 | .............. F21S 2/005 |
| WO | WO-2012039196 A1 * | 3/2012 | ............ G02B 6/0088 |

OTHER PUBLICATIONS

S. Y. Koo et al., "Lighting For Edge", Mar. 17, 2016, Image of "KR 101604290 B1 or 10-1604290" merged with English translation text, 17 pages of image plus English translation text. (Year: 2016).*
이종식 translated as J.S. Lee, "Construction of Seal Hermetically of an Electric Light for Tunnel", May 22, 2003, Image of "KR 200313767 Y1 or 20-0313767" merged with English translation text, 7 pages of image plus English translation text. (Year: 2003).*
C.H. Wu, "A High-sealing Lamp of Preventing Moisture From Entering", Jan. 1, 2019, Image of "CN 109114876 A" merged with English translation text, 16 pages of image plus English translation text. (Year: 2019).*

* cited by examiner

LIGHTING APPARATUS HAVING FIRST AND SECOND LADDER EDGES TO PREVENT WATER FROM ENTERING CONCEALED SPACE

RELATED APPLICATION

The present application is a continued application of U.S. application Ser. No. 17/240,369.

FIELD

The present invention is related to a lighting apparatus, and more particularly related to a lighting apparatus with water proof function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is beneficial to design a light device that can provide water proof. When light devices are installed in outdoor environment or bathrooms, it is helpful to have such function.

However, cost is also an important factor to consider when designing such devices. It would be very helpful if multiple factors are considered to provide an elegant design.

SUMMARY

In some embodiments, a lighting apparatus includes a light source, a light passing cover, a back cover and a rim frame.

The light source is used for emitting a light.

The light passing cover has a first ladder edge.

The rim frame has an inner frame and a light source holder.

The back cover, the rim frame and the light passing cover define a concealed space.

The light source is disposed in the light source holder in the concealed space.

The inner frame defines a light opening for the light to escape from the lighting apparatus.

The inner frame has a second ladder edge surrounding the light opening.

The first ladder edge and the second ladder edge are pressed by the back cover to press to each other.

Multiple ladder protrusion surfaces between the first ladder edge and the second ladder edge prevent water to enter the concealed space.

In some embodiments, the lighting apparatus may also include a light guide plate for guiding the light from the light source to the light opening.

A light guide plate is stacked upon the light passing cover to add a pressing force upon the first ladder edge toward the second ladder edge.

In some embodiments, the light passing cover is a light guide plate for guiding the light from the light source to the light opening.

In some embodiments, a diameter of the light passing cover is larger than the light opening.

In some embodiments, the light passing cover has a diffusion lens for diffusing the light of the light source.

In some embodiments, the light source includes a LED module mounted on a light source plate placed facing toward the light opening.

In some embodiments, the back cover has an electrode for connecting to a driver.

The driver converts an external power to generate a driving current supplied to the light source.

In some embodiments, the electrode is placed on a socket disposed on the back cover for detachably plugging a wire electrically connected to the driver.

In some embodiments, the first ladder edge has multiple protruding teeth.

In some embodiments, the rim frame has a lateral wall, a top edge of the lateral wall is corresponding to the back cover for connecting the back cover.

In some embodiments, the rim frame has a rim surface with a larger diameter than a bottom edge of the surrounding wall for concealing an installation opening of an installation cavity.

The surrounding side wall is placed inside the installation cavity.

In some embodiments, the light passing cover is made of plastic material and the first ladder edge has deformation when engaging the second ladder edge.

In some embodiments, a glue is placed between the first ladder edge and the second ladder edge.

In some embodiments, an elastic layer is placed between the first ladder edge and the second ladder edge.

In some embodiments, a sponge ring is placed inside the concealed space to absorbs water entering via the multiple ladder protrusion surfaces.

In some embodiments, the rim frame has an extension socket for attaching a function module outside the concealed space.

The extension socket provides a structural connection and wireless charging to the function module.

In some embodiments, the function module is attached to the socket via a magnetic unit.

In some embodiments, the function module communicates with a driver of the lighting apparatus In some embodiments, the function module is a speaker module surrounding a side wall of the rim frame.

In some embodiments, a driver is attached to an inner surface of the back cover to be stored in the concealed space.

DETAILED DESCRIPTION

Figure 8:
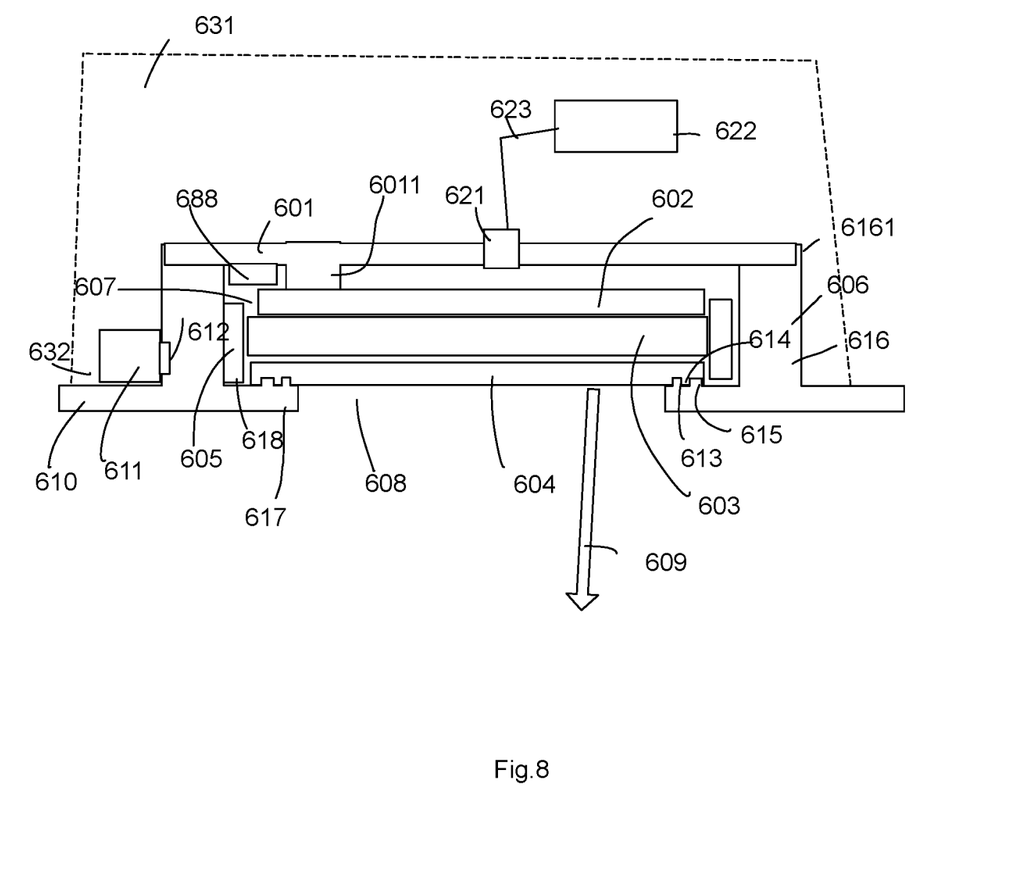
FIG. 8 illustrates another embodiment.

In FIG. 8, a lighting apparatus includes a light source 605, a light passing cover 604, a back cover 601 and a rim frame 606.

The rim frame 606 may be made of a one-piece component or an assembly of multiple components. An example of the rim frame 606 may be found in the examples of FIG. 1 to FIG. 7. But, please be noted that the rim frame 606 is not limited to the illustrated shape of square shape or the shape in that example.

The light source is used for emitting a light. For example, the light source may be a light strip made of a substrate mounted with multiple LED modules. These LED modules are connected in series or other way to receive a driving current and emit the light. In the example of FIG. 1 to FIG. 7, the light source emits the light into a lateral wall of a light guide plate.

The light passing cover 604 has a first ladder edge 614. The first ladder edge 614 is distributed surrounding a peripheral area of the light passing cover 604. For example, if the light passing cover 604 is a square shape, the first ladder edge 614 are multiple protruding structures with concave and convex units surrounding a peripheral edge of the light passing cover.

The rim frame 606 has an inner frame 617 and a light source holder 618.

The back cover 601, the rim frame 606 and the light passing cover 604 define a concealed space 607.

The light source 605 is disposed in the light source holder 618 in the concealed space 607.

The inner frame 617 defines a light opening 608 for the light 609 to escape from the lighting apparatus.

The inner frame 617 has a second ladder edge 615 surrounding the light opening 604.

The first ladder edge 614 and the second ladder edge 615 are pressed by the back cover 601 directly or indirectly to press to each other. For example, the back cover 601 has a protruding structure 6011 pressing a reflective layer 602. The reflective layer 602 further presses the light guide plate 603, and then the light guide plate 603 presses the light passing cover 604 so as to press the inner rim 617.

Multiple ladder protrusion surfaces 613 between the first ladder edge 614 and the second ladder edge 615 prevent water to enter the concealed space 607.

In some embodiments, the lighting apparatus may also include a light guide plate 603 for guiding the light 609 from the light source 612 to the light opening 608. For example, the light guide plate 603 is a transparent plastic plate with a surface facing downwardly to the light opening 604. There are multiple tiny dots disposed, e.g. by a laser machine, on the surface of the light guide plate 603 so that the light entering the light guide plate 603 escape from these tiny dots toward the light opening 608.

A light guide plate 603 is stacked upon the light passing cover 604 to add a pressing force upon the first ladder edge 614 toward the second ladder edge 615.

In some embodiments, the light passing cover is a light guide plate for guiding the light from the light source to the light opening. This is a variation of the example mentioned above. Persons of ordinary skilled in the art may regard the light passing cover 604 and the light guide plate 603 in FIG. 8 to be integrated as a single unit. No repeated drawings are provided for this example for brevity.

In some embodiments, a diameter of the light passing cover is larger than the light opening. This is illustrated in FIG. 8. The light passing cover 604 has a larger diameter than the light opening so that the light passing cover 604 is stopped and held by the inner rim 617 when the light passing cover 604 is placed from top side downwardly to engage the inner rim 617.

In some embodiments, the light passing cover has a diffusion lens for diffusing the light of the light source. For example, the light passing cover is roughen or added with diffusion lens for diffusing the light 609 to make the light more soft.

Figure 9:
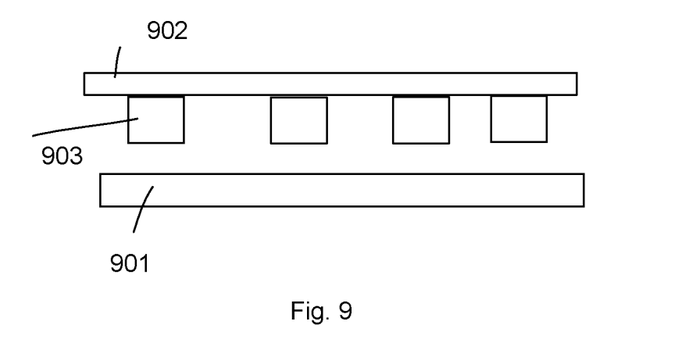
FIG. 9 illustrates another type of a panel light device.

In FIG. 9, the light source includes a LED module 903 mounted on a light source plate 902 placed facing toward the light opening 901. In other words, in alternative embodiments, the light source emits the light directly toward the light opening 901 without using a light guide plate in the example of FIG. 8.

In FIG. 8, the back cover 601 has an electrode 621 for connecting to a driver 622.

The driver 622 converts an external power to generate a driving current supplied to the light source. For example, the driver 622 includes a rectifier and a filter for converting an alternating current of 110V to a direct current for used by LED modules of the light source. The driver 622 may also have a control circuit for adjusting color and/or color temperature of the light source. The driver 622 may have a wireless circuit for receiving an external command from an external device like a mobile phone to adjust the light source or perform other tasks.

In some embodiments, the electrode 621 is placed on a socket disposed on the back cover for detachably plugging a wire electrically connected to the driver.

In some embodiments, the first ladder edge has multiple protruding teeth. For example, in the example of FIG. 8, there are two teeth edges of the first ladder edge and the second ladder edge. There may be more than two teeth edges for the two ladder edges to match and engage to each other.

In some embodiments, the rim frame 606 has a lateral wall 616, a top edge 6161 of the lateral wall 616 is corresponding to the back cover 601 for connecting the back cover 601. The lateral wall 616 to the inner rim 617 may be a plastic unit that is water proof. The only water entrance in the bottom side of the lighting apparatus is the connection between the light passing cover 604 and the inner rim 617.

In some embodiments, the rim frame has a rim surface 610 with a larger diameter than a bottom edge 616 of the surrounding wall for concealing an installation opening 632 of an installation cavity 631.

The surrounding side wall 616 is placed inside the installation cavity 631.

In some embodiments, the light passing cover is made of plastic material and the first ladder edge has deformation when engaging the second ladder edge. For example, the light passing cover is made of a plastic material with certain elastic characteristic. When the light passing cover is pressed over a threshold of a pressing force, the engaged surface has certain deformation to more closely engaging the second ladder edge of the inner rim.

Figure 11:
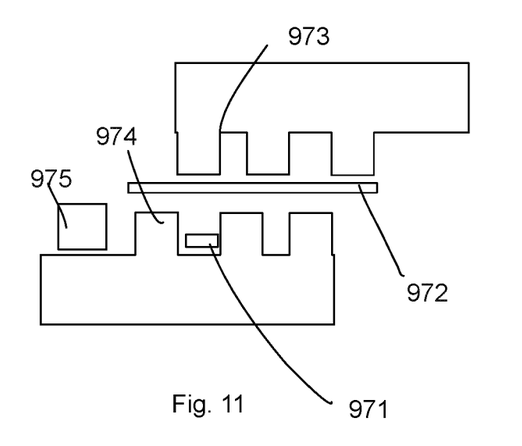
FIG. 11 illustrates a zoom up view of ladder structure connection.

In FIG. 11, a glue 971 is placed between the first ladder edge and the second ladder edge. Such glue may be applied before engaging the first ladder edge 973 to the second ladder edge 974.

In some embodiments, an elastic layer 972 is placed between the first ladder edge 973 and the second ladder edge 974.

In some embodiments, a sponge ring 975 is placed inside the concealed space to absorbs water entering via the multiple ladder protrusion surfaces. Such sponge ring 975 may absorbs any water not prevented by the ladder edge structures.

In FIG. 8, the rim frame has an extension socket 612 for attaching a function module 611 outside the concealed space 607. In other words, to keep the water proof feature, the adding function module like wireless module, a speaker, a detector, a battery is placed outside the water proof structure.

The extension socket provides a structural connection and wireless charging to the function module. For example, the extension socket 612 may provide a plugging hole or may have a flat surface but use magnetic, hooking structure or other units for attaching the function module.

In some embodiments, the function module is attached to the socket via a magnetic unit. In such case, the alignment is performed between the function module with the lighting apparatus.

In some embodiments, the function module communicates with a driver of the lighting apparatus In some embodiments, the function module is a speaker module surrounding a side wall of the rim frame.

In some embodiments of FIG. 8, a driver 688 may be placed inside the concealed space 607, e.g. to be attached to an inner surface of the back cover 601 to be stored in the concealed space. For example, the back cover is used as a substrate for mounting driver components of the driver 688.

Figure 10:
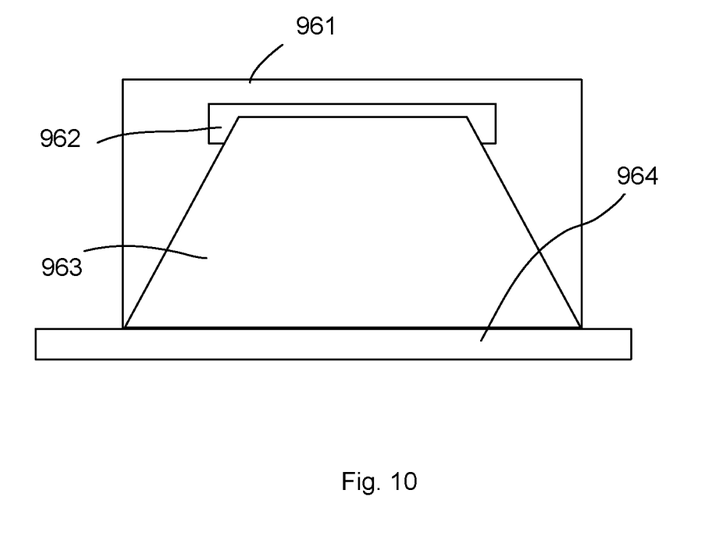
FIG. 10 illustrates a downlight device example.

FIG. 10 illustrates a downlight device. The downlight device has a rim frame 961 connected to a light passing cover 964 with the ladder structures mentioned above. There is a reflective cup 963 and a light source 962. In such example, the back cover may be canceled and integrated directly with the rim frame 961.

Figure 1:
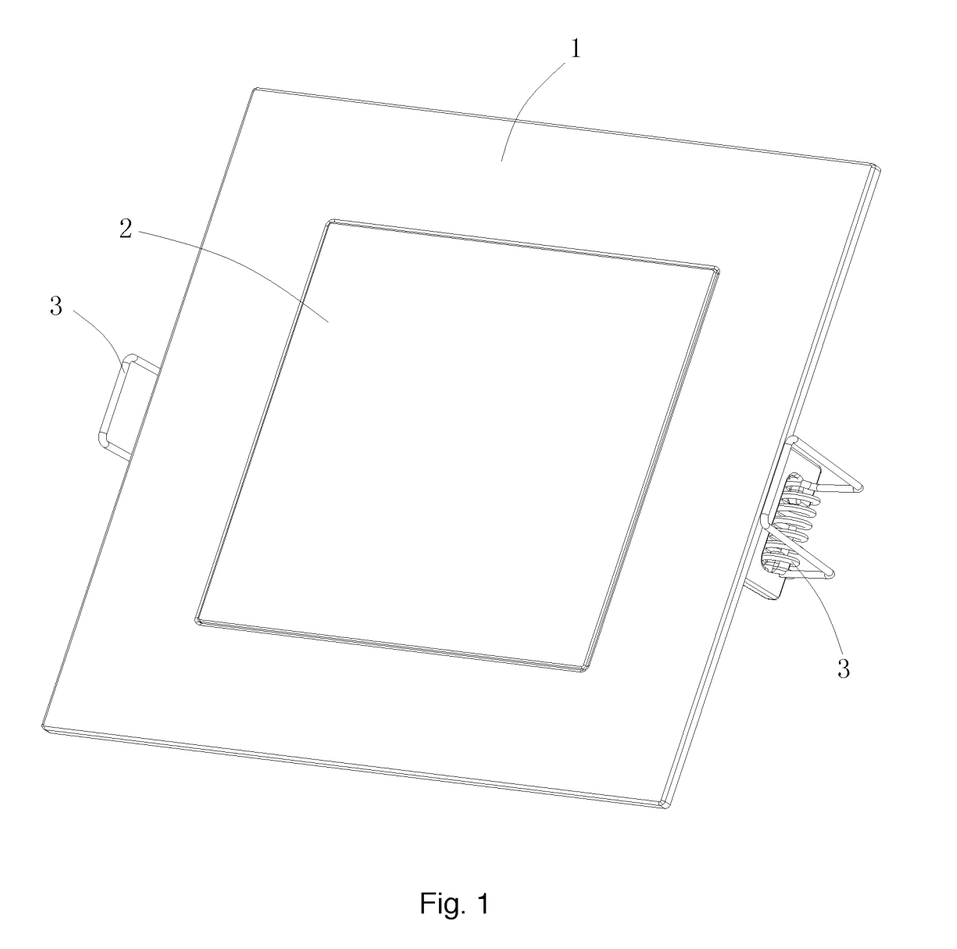
FIG. 1 illustrates a lighting apparatus embodiment.

Please refer to FIG. 1. FIG. 1 illustrates a lighting apparatus embodiment.

In FIG. 1, the lighting apparatus has a rim frame 1, a light passing cover 2 and a bracket 3 to be installed to an installation cavity.

Figure 2:
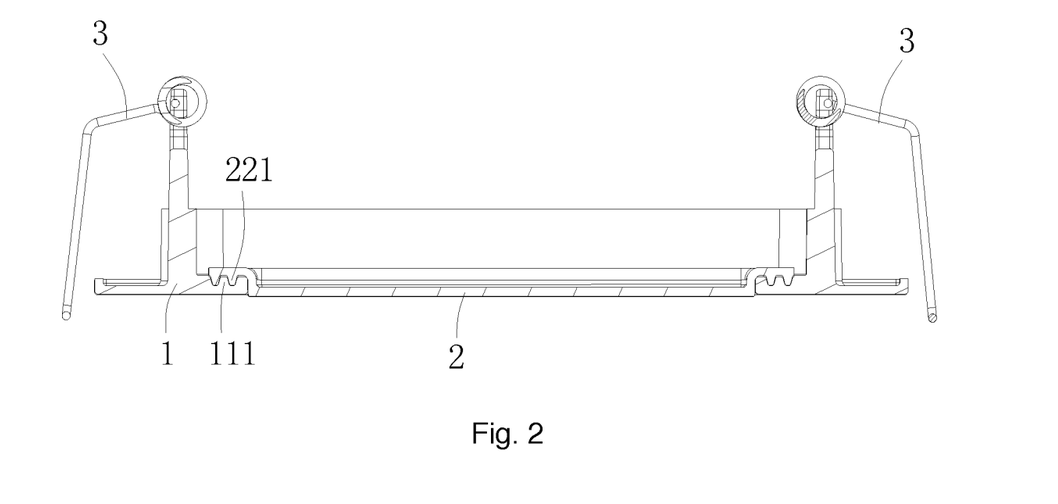
FIG. 2 illustrates a side view of the embodiment in FIG. 1.

FIG. 2 shows a side view of the example in FIG. 1. The same reference numerals refer to the same components and are not repeated again for brevity.

The rim frame 1 has the second ladder edge 111 and the light passing cover 2 has the first ladder edge 221, forming a water proof structure.

Figure 3:
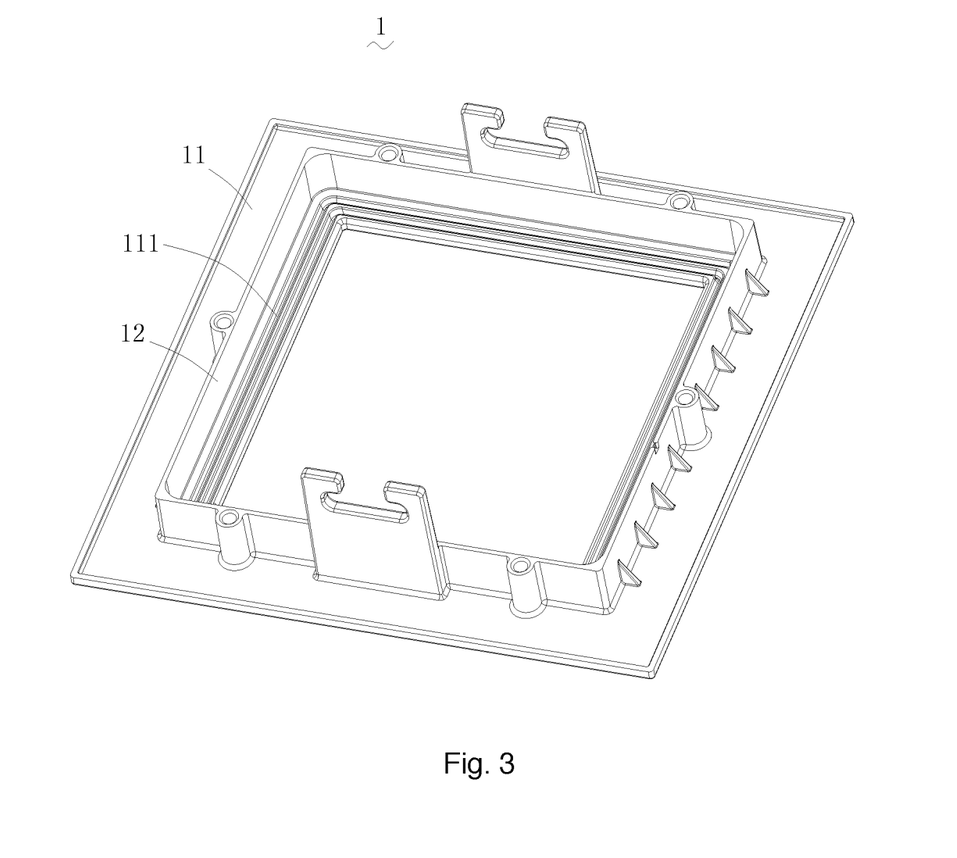
FIG. 3 illustrates an example of a rim frame.
Figure 4:
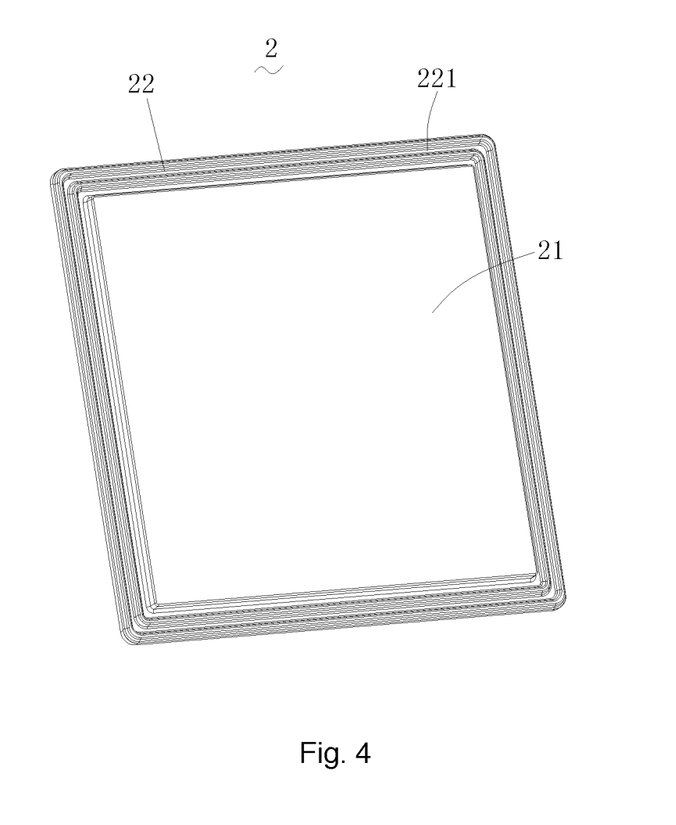
FIG. 4 illustrates an example of a light passing cover.

FIG. 3 shows a perspective view of the example in FIG. 1. The rim frame 1 has a side wall 12 that provides a container space for inserting the components of the lighting apparatus. FIG. 4 shows an example of the light passing cover 2. There is a central part 21 for allowing light to pass through. The edge part 22 has the first ladder edge 221 for matching the second ladder edge of the inner rim.

Figure 5:
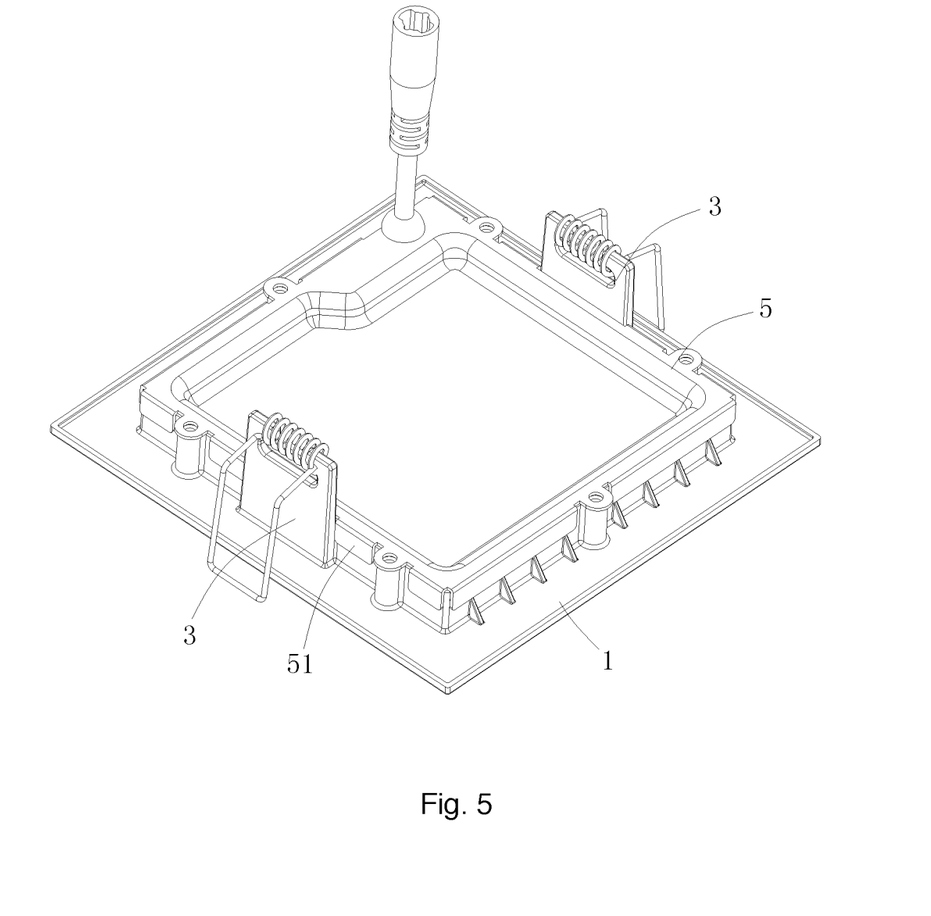
FIG. 5 illustrates a back view of the example in FIG. 1

FIG. 5 shows another view of the example of the rim frame 1. The back cover 5 has a back cover connector 51.

Figure 6:
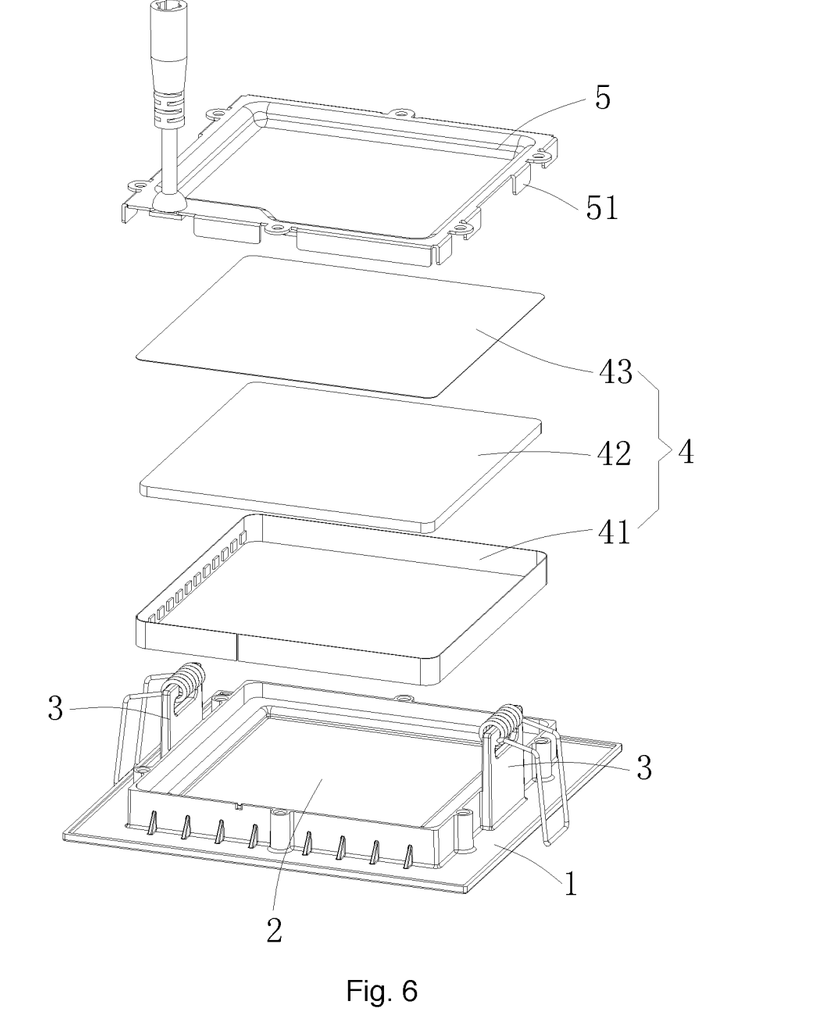
FIG. 6 illustrates an exploded view of the embodiment in FIG. 1.

FIG. 6 shows an exploded view of the components in the example of FIG. 1.

In FIG. 6, the back cover 5 has a back cover connector 51. The back cover 5 presses the reflector layer 43 that further presses the light guide plate 42. The reflector layer 43 and the light guide plate 42 together form an optical unit 5 that guides light to change directions.

The light source 41 emits light to the light guide plate 42 to emit a light.

Figure 7:
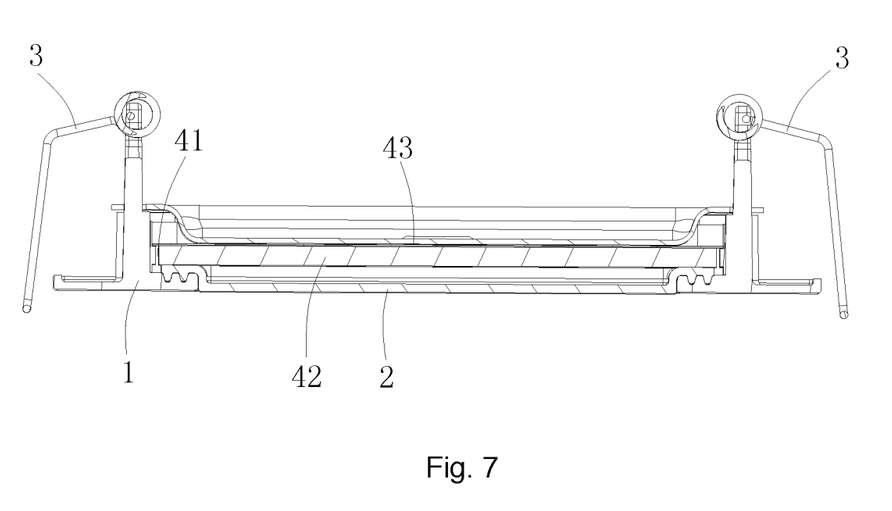
FIG. 7 illustrates a structural diagram explains ladder surfaces.

FIG. 7 shows a side view illustrating the concept mentioned above.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a light source for emitting a light:
a light passing cover with a first ladder edge;
a back cover; and
a rim frame having an inner frame and a light source holder, wherein the back cover, the rim frame and the light passing cover define a concealed space, the light source is disposed in the light source holder in the concealed space, the inner frame defines a light opening for the light to escape from the lighting apparatus, the inner frame has a second ladder edge surrounding the light opening, wherein the back cover, the first ladder edge and the second ladder edge are arranged sequentially, wherein the first ladder edge and the second ladder edge press each other, wherein multiple ladder protrusion surfaces between the first ladder edge and the second ladder edge prevent water to enter the concealed space, wherein the rim frame has an extension socket for attaching a function module outside the concealed space, the extension socket provides a structural connection and wireless charging to the function module.

2. The lighting apparatus of claim 1, further comprising a light guide plate for guiding the light from the light source to the light opening, wherein the light guide plate is stacked upon the light passing cover to add a pressing force upon the first ladder edge toward the second ladder edge.

3. The lighting apparatus of claim 1, wherein the light passing cover is a light guide plate for guiding the light from the light source to the light opening.

4. The lighting apparatus of claim 3, wherein a diameter of the light passing cover is larger than the light opening.

5. The lighting apparatus of claim 1, wherein the light passing cover has a diffusion lens for diffusing the light of the light source.

6. The lighting apparatus of claim 1, wherein the light source comprises a LED module mounted on a light source plate placed facing toward the light opening.

7. The lighting apparatus of claim 1, wherein the back cover has an electrode for connecting to a driver, the driver converts an external power to generate a driving current supplied to the light source.

8. The lighting apparatus of claim 7, wherein the electrode is placed on a socket disposed on the back cover for detachably plugging a wire electrically connected to the driver.

9. The lighting apparatus of claim 1, wherein the first ladder edge has multiple protruding teeth.

10. The lighting apparatus of claim 1, wherein the rim frame has a lateral wall, a top edge of the lateral wall is corresponding to the back cover for connecting the back cover.

11. The lighting apparatus of claim 10, wherein the rim frame has a rim surface with a larger diameter than a bottom edge of a surrounding wall for concealing an installation opening of an installation cavity, the surrounding wall is placed inside the installation cavity.

12. The lighting apparatus of claim 1, wherein the light passing cover is made of plastic material and the first ladder edge has deformation when engaging the second ladder edge.

13. The lighting apparatus of claim 1, wherein a glue is placed between the first ladder edge and the second ladder edge.

14. The lighting apparatus of claim 1, wherein an elastic layer is placed between the first ladder edge and the second ladder edge.

15. The lighting apparatus of claim 1, wherein a sponge ring is placed inside the concealed space to absorbs water entering via the multiple ladder protrusion surfaces.

16. The lighting apparatus of claim 1, wherein the function module is attached to the socket via a magnetic unit.

17. The lighting apparatus of claim 1, wherein the function module communicates with a driver of the lighting apparatus.

18. The lighting apparatus of claim 1, wherein the function module is a speaker module surrounding a side wall of the rim frame.

19. The lighting apparatus of claim 1, wherein a driver is attached to an inner surface of the back cover to be stored in the concealed space.

* * * * *